United States Patent [19]

Clarke et al.

[11] 4,045,271
[45] Aug. 30, 1977

[54] ULTRASONIC METHOD AND APPARATUS FOR MANUFACTURING BRASSIERE TAPES

[75] Inventors: Robert Alfred Clarke, White Plains; Peter J. Kuhl, Jackson Heights; Richard H. Paschke, Medford, all of N.Y.

[73] Assignee: Cavitron Corporation, New York, N.Y.

[21] Appl. No.: 736,786

[22] Filed: Oct. 29, 1976

[51] Int. Cl.² .......................................... B32B 31/10
[52] U.S. Cl. ............................. 156/366; 24/73 LF; 156/459; 156/515; 156/516; 156/543; 228/1 A
[58] Field of Search ............... 156/361, 366, 515, 516, 156/459, 580.2, 543, 73.1; 310/8.1; 228/1; 24/73 LF

[56] References Cited

U.S. PATENT DOCUMENTS

| | | | |
|---|---|---|---|
| 3,776,804 | 12/1973 | Monahan et al. | 156/515 |
| 3,874,975 | 4/1975 | Laooain | 156/515 |

*Primary Examiner*—Edward G. Whitby
*Attorney, Agent, or Firm*—Philip Sperber

[57] ABSTRACT

Brassiere tapes having a body portion and a pair of overlapping tabs extending outwardly therefrom are manufactured by providing a continuous strip of the tape having elements thereon and layers of material in the body portion and in each of the tabs weldable with ultrasonic vibratory energy, and separating the tabs physically from each other and simultaneously maintaining the tabs in acoustical energy coupling relationship to each other, such that the individual layers of material in the strip may be simultaneously severed and welded across the body portion and the tabs when interposed between an ultrasonically vibrating horn and an anvil, except for the layers of material in the tabs physically separated from each other. Advancing of the strip is accomplished on an intermittent basis between the horn and the anvil by means of the elements for continuously producing the tapes having a desired number of elements thereon. The separating of the tabs is obtained by interposing therebetween an insulation element produced from a plastic or paper material characterized in that it does not bond to the layers of material in contact with the element but simultaneously permits the vibratory energy to be transmitted therethrough.

29 Claims, 12 Drawing Figures

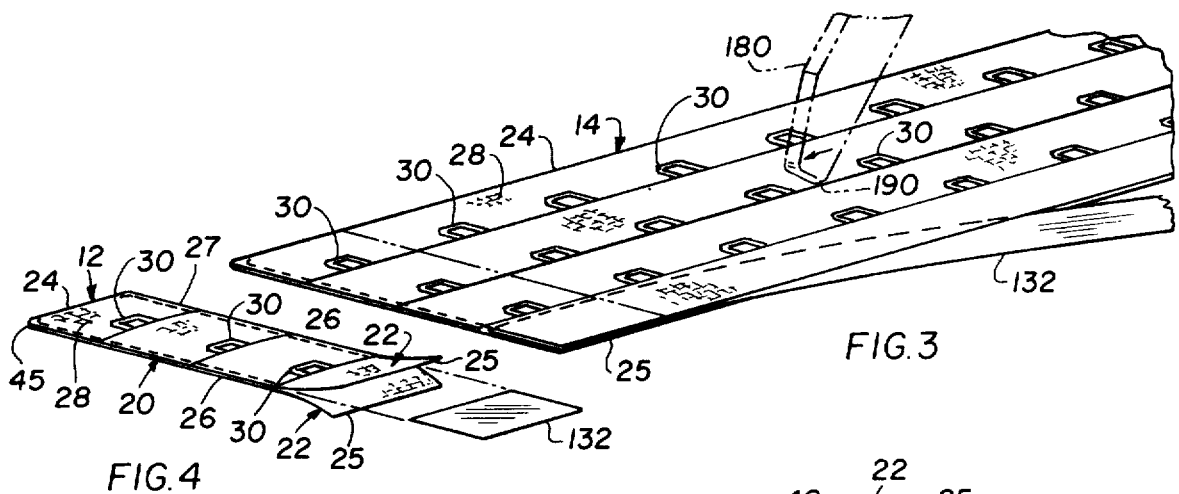
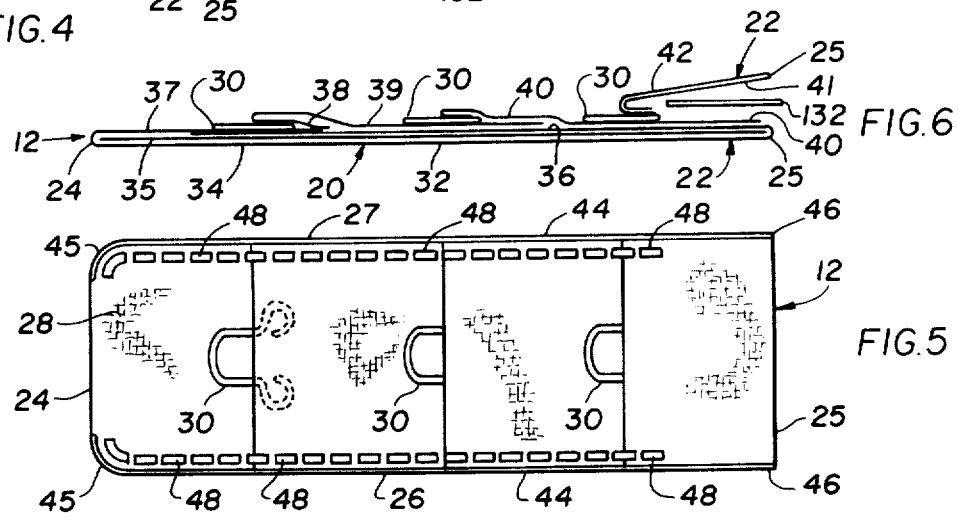
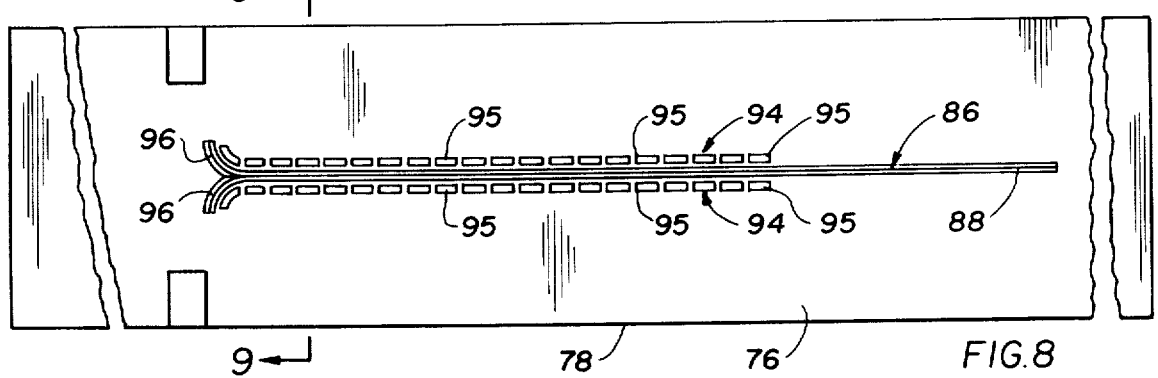
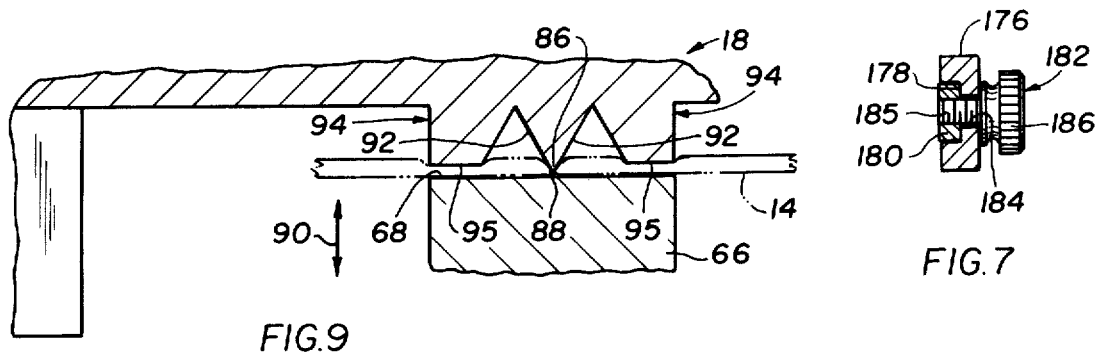

ULTRASONIC METHOD AND APPARATUS FOR MANUFACTURING BRASSIERE TAPES

BACKGROUND OF THE INVENTION

The present invention relates generally to the manufacture of articles from an elongated continuous strip, and more particularly concerns an improved apparatus and method for producing tapes to be sewn to brassieres in the manufacture thereof.

Prior to the present invention considerable time and effort had to be expended in order to produce the individual tapes that are joined to the rear portion of a brassiere. In the manufacture of this type of wearing apparel, or undergarment, one tape is utilized having hooks thereon and the other tape having eyes thereon, which fastening elements are coupled together in adjusted relationship in a manner well known. In order to manufacture these tapes previously, after they were cut from a continuous strip, the spaced apart ends had to be hand sewn in order to join together the overlapping flexible layers of material from which the tape is formed.

Applicants have now discovered that it is possible to utilize ultrasonic vibratory energy to be able to form these tapes on a continuous basis automatically. The flexible layers of material from which the tapes are formed, are generally woven and have a sufficient synthetic composition, generally at least thirty percent, to be capable of welding with ultrasonic energy. One of the problems faced by the inventors is that the tape included a body portion comprised of various overlapping layers as well as a pair of tabs which similarly contained overlapping layers of fabric.

Accordingly, conventional ultrasonic welding techniques in which the strip of tape was interposed between a horn and anvil between the forward edge and rear edge of the strip would effectuate the welding of the individual overlapping pair of tabs together. This would be unacceptable in that the tabs are subsequently utilized to have positioned therebetween a portion of the garment to which they are joined. Faced with this problem, the applicants discovered that it is possible to interpose between the tabs an insulation element capable of being readily severed and having the ability for transmitting therethrough ultrasonic vibratory energy. This permits the individual layers of material in each of the tabs to be simultaneously welded together, while maintaining the tabs free from each other.

The ability to interpose a non-weldable insulated element, from paper or plastic material, between respective layers of weldable fabric is not obvious from the prior art, although there has been disclosed the concept of interposing a pattern-like sheet between a vibratory tool and the layers of material to be joined, in a manner described in U.S. Pat. No. 3,817,802. Applicants have advanced the art by now discovering that the ultrasonic vibratory energy can be applied to a first layer of overlapping sheets of material, and that this energy is capable of then continuing through an insulation element, to a second layer of overlapping sheets of material. Applicants have also discovered that the insulation element may be of minimal thickness, such that it is easily severed or cut simultaneously with the overlapping sheets on the opposite sides thereof.

While the instant invention will be primarily described in conjunction with the manufacture of articles to be utilized as brassiere tapes, it will be apparent that the same principles disclosed herein may be applied to other articles formed in a continuous strip having overlapping layers of fabric, or material, in which a pair of tabs or other protrusions extend therefrom for subsequent utilization for securement to a garment or other end product.

OBJECTS OF THE INVENTION

An object of the present invention is to provide novel methods and apparatus for the continuous forming of brassiere tapes or the like.

Another object of the present invention is to provide novel methods and apparatus for the continuous forming from an elongated strip of material tapes in which selective portions thereof are to be simultaneously welded and cut from the elongated strip.

Another object of the present invention is to provide an improved method and apparatus for the continuous feeding of an elongated strip into a work station having an ultrasonic horn and anvil, with means for sealing and cutting the strip on a continuous operating basis at suitable speeds for manufacturing of products therefrom.

Other objects and advantages of the present invention will become apparent as the disclosure proceeds.

SUMMARY OF THE INVENTION

The outstanding and unexpected results obtained by the practice of the method and apparatus of this invention are obtained by a series of features, steps and elements assembled and working together in interrelated combination. The novel method and apparatus of the present invention results in the elimination of a sewing operation on each tape and the savings in the attendant material handling costs that would be normally incurred.

The novel brassiere tape of the present invention comprises a body portion having various overlapping layers of material with a synthetic composition level to permit ultrasonic welding thereof. The body portion has a forward edge, with a pair of tabs extending outwardly from the body portion. Each said tab terminating in a rear edge in substantially parallel spaced relationship to the forward edge and having spaced apart ends extending between the edges. At least one row of elements in the form of hooks or eyes is secured to the body portion along a plane parallel to the ends, and the layers of material at each of the ends on the tape are welded to each other between the spaced apart edges, whereby the tabs are adapted to receive therebetween the portion of the brassiere they are to be secured to. A plurality of longitudinally aligned spaced apart spot welds on each body portion adjacent each of the ends is also provided.

The brassiere tapes are ultrasonically produced from an elongated continuous strip of material formed of flexible layers having a forward edge, and a rear edge terminating in a pair of overlapping tabs, with a plurality of spatially separated elements in the form of hooks or eyes extending above the strip between the edges. In view of the fact that each tape had to have an equal number of hooks or eyes contained thereon, and the elements were not always equally spaced, the means for feeding of the strip on an intermittent basis was also a problem that has been solved by the present invention, as hereinafter discussed.

Basically the apparatus comprises ultrasonic welding means having a horn with a forward end for engaging one side of the strip, and means for vibrating the horn at an ultrasonic rate. Anvil means is utilized having a surface for opposing and cooperating with the forward end for engaging the opposite side of the strip. The horn and the anvil means are adapted to simultaneously sever and weld the strip transversely between the edges when brought into operative relationship with each other.

To provide the simultaneous cutting and welding operation, the anvil surface may comprise first surface means for engaging the material to be welded and severed between the edges, with the first surface means being formed with a knife edge extending transversely to the path of travel of the strip for compressing and welding the material interposed between the first surface means and the horn along a comparatively narrow path responsive to the ultrasonic energy applied to the horn. The knife edge cutting through the tabs and the insulation element extending therebetween. Second surface means is formed adjacent the first surface means on each side thereof for simultaneously forming a plurality of embossed welds between the layers of material of the strip on the trailing end of one tape and the leading end of another tape.

In view of the fact that a continuous strip of tape material is formed, the problem of positioning between the tabs an insulator element had to be solved. The solution was the utilization of interposing means provided for positioning between the tabs an insulator element capable of transmitting therethrough ultrasonic vibratory energy prior to the anvil means and the horn being brought into operative relationship with each other, such that the insulation element permits individual layers of material in each of the tabs to be simultaneously welded together as the tabs and the element are severed.

Reciprocating means is utilized for effecting relative movement between the anvil means and the horn between an open position in which the anvil means and the horn are spaced apart for receiving the strip therebetween to an operative position in which the surface of the anvil means and the forward end of the horn are moved together for engaging the strip on opposite sides thereof as the horn in the operative position is ultrasonically vibrated to effect a severing and welding of the layers of the strip across the width thereof between the edges so as to form the trailing end of one tape and the leading end of another tape.

Accordingly, a distinct advantage of the second surface means is the ability to vary the pattern selected to appear on each individual tape. The ability to produce a varied pattern is an additional factor related to the market acceptance of the end product. The second surface means permits the pattern to look like "stitching", yet the bond formed is stronger than the threads themselves utilized in a sewing operation. Further, by simultaneously performing the welding and cutting operation, in accordance with the present invention, certain labor and materials handling expenses, in addition to the cost of the thread, have also been eliminated.

The useful life of the end product has also been prolonged by the use of the present invention. It has been found that after a number of washings of a brassiere that is manufactured by conventional assembly procedures, there is a tendency for a breaking of the threads normally utilized on the tapes. The present invention eliminates this problem since no thread is utilized in the manufacturing process. Accordingly, another advantage of the present invention is to improve the useful life of the end product by eliminating puckering and abrasions to the wearer from the broken thread. Automation of the process of manufacturing tapes also provides increased quality of the end product since it is uniformly produced mechanically, thereby eliminating variations encountered in hand produced tapes.

Because the spacing between the elements along the strip of material was not equidistant from each other a new and novel means for indexing or feeding of the strip relative to the working station consisting of the horn and anvil means had to be invented. The tape is fed from a roll and the tolerance buildup between the elements could result in the horn and anvil means engaging an element rather than the space therebetween. Accordingly, applicants have devised a novel feeding means for intermittently advancing the leading end of the strip a predetermined distance by means of one of the elements. The feeding means is movable from a retracted position to an extended position in timed relationship to the reciprocating means, and retracting means moves the feeding means from the extended position to the retracted position for contacting another of the spatially separated elements and subsequently advancing the strip in timed relationship to the reciprocating means.

The feeding means may be comprised of engaging means pivotally movable into contact with one of the elements on the strip when advancing same, and over the elements when moved from the extended position to the retracted position, and having biasing means urging the engaging means into contact with the element when advancing the strip.

An automatic electrical control system is also provided to perform the necessary sequencing of all the operations performed on the strip, as well as the movement of the reciprocating means and the feeding means, to and from their respective positions.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a perspective diagrammatic view of the elongated tape and the insulator element positioned relative to the tabs;

FIG. 4 is a perspective view of a brassiere tape formed from the elongated strip;

FIG. 5 is a top plan view of an article manufactured by the equipment illustrated in FIG. 1 in the form of a brassiere tape;

FIG. 6 is a side view illustrating the respective layers of material forming the strip;

FIG. 7 is a sectional view taken along lines 7—7 of FIG. 1;

FIG. 8 is a bottom plan view of the anvil having thereon the knife edge and elements for forming the embossed welds;

FIG. 9 is a sectional view taken along lines 9—9 of FIG. 8;

DETAILED DESCRIPTION OF THE DRAWINGS

Figure 1:
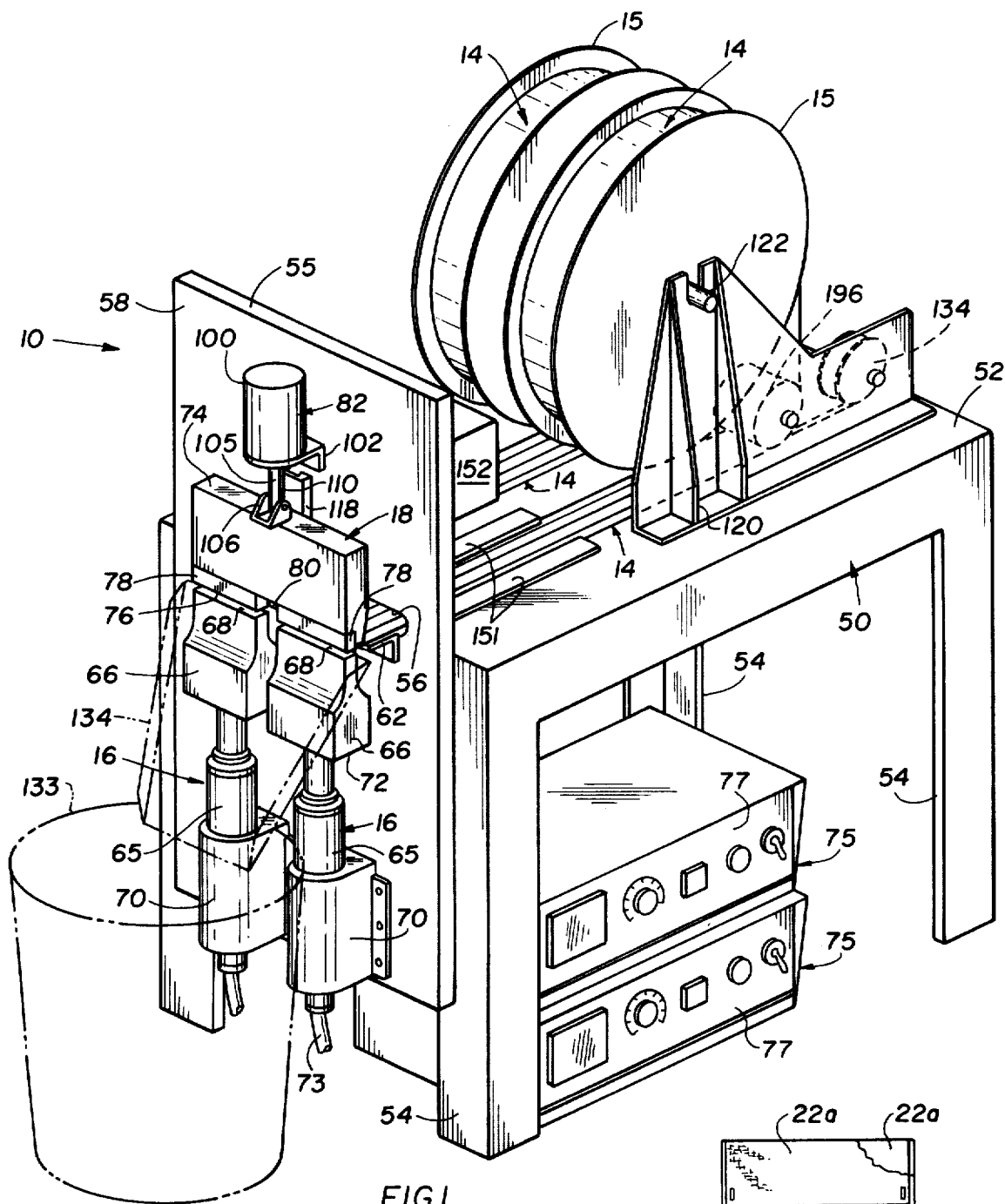
FIG. 1 is a front perspective view of a preferred embodiment of the present invention.
Figure 2:
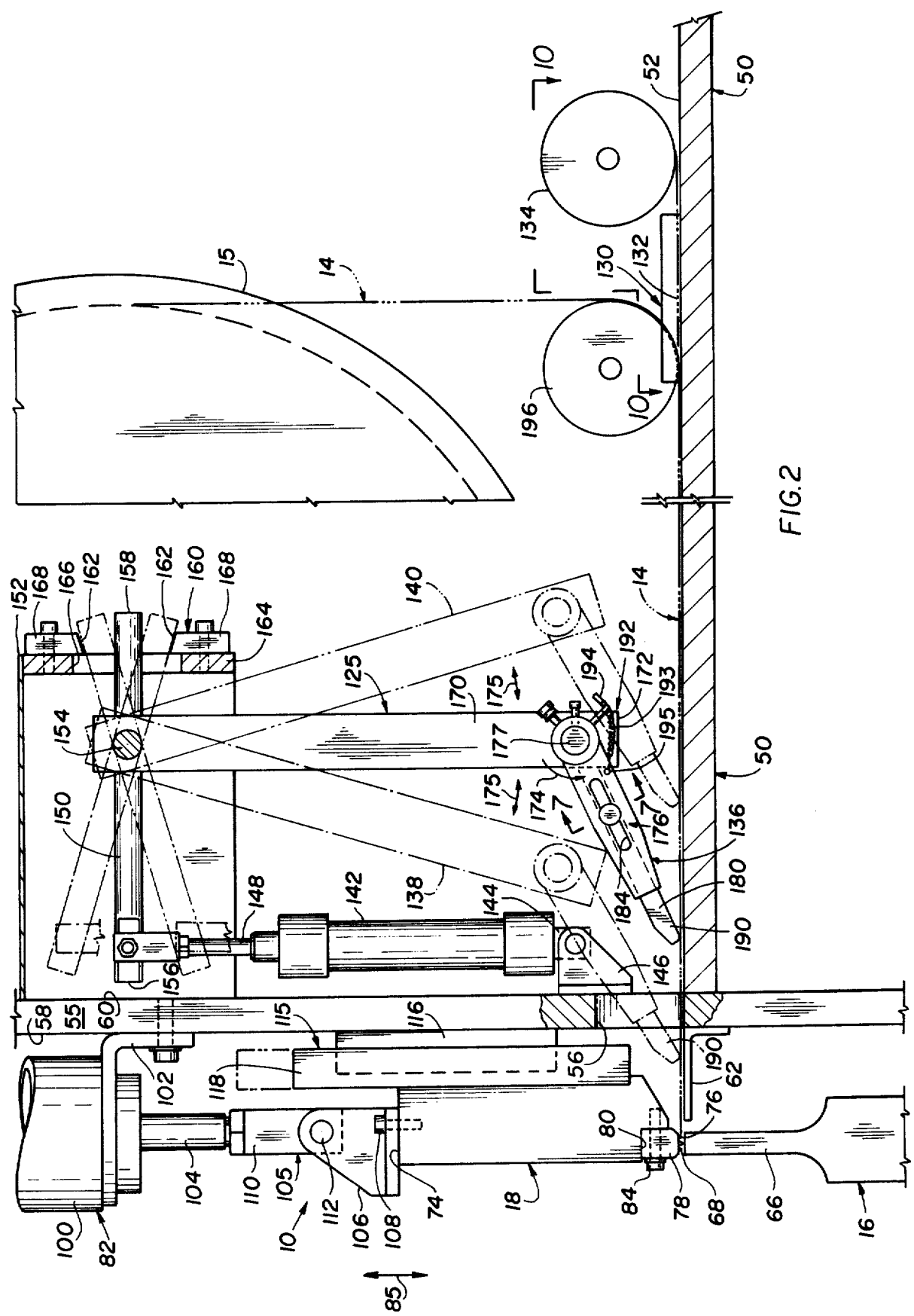
FIG. 2 is a partial side view illustrating the equipment of FIG. 1.

Referring to the drawings, and initially to FIGS. 1 and 2 thereof, there is illustrated a preferred embodiment of the apparatus 10 for manufacturing individual articles or tapes 12 from a continuous elongated strip 14 that may be provided on a roll 15. To produce the individual tapes 12 from the strip 14, there is provided the necessary interrelated ultrasonic welding means 16 and cooperating anvil means 18, to produce the individual tapes 12.

To more fully appreciate the various points of novelty of the present invention, an initial discussion of the continuous strip 14 and the configuration of the brasiere tape 12 is initially provided. The strip 14, as illustrated with respect to FIGS. 3 through 6, includes a body portion 20 and a pair of tabs or flaps 22 extending outwardly from the body portion 20. Each tape 12 includes a forward edge 24 and a rear edge 25 on each of the respective tabs 22. The front edge 24 and rear edges 25 extend in substantially parallel spaced relationship to each other. When the tape 12 is formed, there is provided a pair of spaced apart ends 26 and 27. The spaced apart end 26 is sometimes referred to as the forward or leading end of the strip 14, and the end 27 is sometimes referred to as the trailing or rear end. Mounted on the upper surface 28 of the strip 14 are a plurality of spaced apart rows containing fastening elements 30 thereon.

As illustrated in FIG. 3, the strip 14 has a plurality of these individual rows of elements extending in a plane parallel to the ends 26 and 27. The elements 30 may take various forms and shapes and generally include an eye, as ilustrated in FIGS. 4 and 5, or a hook. As particularly illustrated in FIG. 6, the individual tape 12 is comprised of flexible layers of material which may be woven as a fabric or of synthetic sheet material. If the individual sheets of material are woven, they have a sufficient synthetic content, generally at least thirty percent, in order to be ultrasonically weldable. The spatially separated elements 30 extend above the upper surface 28 such that the strip 14 may be advanced on the lower surface 32 thereof.

In the manufacture of the strip 14 there are provided overlapping sheets 34, 35, 36, 37, 38, 39, 40, 41 and 42. In certain areas of the strip 14 between the edges 24 and 25 there may be two individual layers of fabric in overlapping relationship to each other or there may be more. The present invention has the ability to effectuate the weld between two or more layers as required. These various layers 34 through 42, inclusive, are obtained due to the various folds that are provided. When the strip 14 is processed between the ultrasonic welding means 16 and anvil means 18, a particular width is severed and simultaneously there is formed a welded or bonded seam 44 adjacent each end 26 and 27 of each individual tape. The seam or weld 44 has a forward end 45 that may be contoured and extend adjacent the forward edge 24 and terminate at a terminal end 46 which is adjacent the rear edge 25.

Accordingly, an important feature of the present invention is that the weld extends across each of the tabs 22 such that all of the overlapping layers of material are welded along each end 26 and 27 of the tape 12. For both strength and aesthetic reasons, a plurality of longitudinally aligned spaced apart spot welds are provided adjacent each seam 44. Having produced a tape 12 with these characteristics, the tape 12 may thereafter be utilized on the garment and be secured in place by the respective tabs 22 which have not been welded together in a manner hereinafter described in greater detail.

For mounting of the welding means 16 and anvil means 18, a frame 50 is provided having a supporting surface 52 on which the strip 14 will be intermittently advanced. The frame 50 may include a plurality of vertically extending legs 54 for supporting the surface 52. A vertically extending support or mounting plate 55 may be provided at one end of the frame 50 with an opening 56 extending therethrough to permit the passage of the continuous strip 14. The mounting plate 55 has a front surface 58 and rear surface 60.

The ultrasonic welding means 16, as illustrated in FIG. 1, may be mounted in a vertically extended position relative to the mounting plate 55 which may have a support extension 62 mounted thereon. The apparatus 10 is capable of producing the tapes 12 from either a single roll 15 or a dual roll mounted in side by side relationship with each other. Obviously, several rolls 15 may be mounted on a common axis and processed through the machine simultaneously.

The ultrasonic welding means 16 is comprised of an ultrasonic motor or transducer 65, well known in the art, that may have coupled thereto an ultrasonic horn or tool 66 having a forward end 68 that extends in a plane substantially parallel with the surface 55. The ultrasonic motor 65 is secured as by bracket 70 to the mounting plate 55. The horn 66 has its output end 68 in position to engage the lower surface 32 of the strip 14 as it is advanced intermittently with respect thereto. The horn 66 may be in the form of an acoustical impedance transformer designed to increase the amplitude of vibration between its rear end 72 and the forward end 68. A cable 73 connects each motor 65 to a converter or generator unit 75 which has associated therewith various controls on the front panel 77.

The operating frequency of the motor 65 is determined by the relationship with the generator unit 75 which receives 60 Hz line voltage and delivers high frequency power, typically in the range of 20 kHz to 40 kHz. The term "ultrasonic" as herein used is to cover the frequency range of 5 kHz to 1,000 kHz. As is well known, the motor 65 converts the electrical energy applied thereto to mechanical vibrations by use of piezoelectric or magnetostrictive elements. in cooperating relationship with the ultrasonic welding means 16 there is mounted the anvil means 18 for engaging the opposite or upper side 28 of the strip 14. The anvil 18 and horn 66 are adapted to simultaneously sever the strip 14 transversely between the edges 24 and 25 and form the welds 44 adjacent each of the ends 26 and 27. The anvil 18 has a top end 74 and bottom end 76 that becomes part of the working surface, as illustrated in FIGS. 8 and 9 and hereinafter discussed.

The anvil 18 may extend transversely across the width of two horns 66 and have removable plates 78 mounted on the bottom end thereof. The removable plates 78 are replaced from time to time if the configuration of the welds 48 is to be modified, or due to dulling of the knife edge associated with the anvil plates 78.

Reciprocating means 82 is utilized for movement of the anvil 18 between an open position, in which the anvil means 18 and horn 66 are vertically spaced apart for receiving the strip 14 therebetween, to an operative or closed position, as illustrated in FIGS. 1 and 2, in which the surface 76 of the anvil means 18 and the forward end 68 of the horn are moved together for engaging the strip 14 on opposite sides thereof. The reciprocating means is cycled to maintain the operative position for a selected period of time in order to perform the necessary cutting and welding operations. The removable plates 78 may be secured as by fasteners 84 to the anvil 18, as illustrated in FIG. 2. The bottom end 80 of the anvil 18 may abut the upper end of the removable plates 78.

It is fully appreciated that although in the preferred embodiment the anvil 18 is mounted for reciprocal motion, as illustrated by double headed arrow 85, that it is also possible to reciprocate the ultrasonic motors 65. Furthermore, the plate 78 may form the forward portion of a horn, rather than form part of the anvil means 18. The horn 66 is longitudinally vibrated to apply the vibratory forces in a plane substantially perpendicular to the bottom end 76 of each anvil plate 78. Other means of providing this vibratory motion are within the scope of the present invention.

The individual removable plates 78 are illustrated in FIGS. 8 and 9 and are designed to simultaneously sever and weld the strip 14 transversely across its width between the spaced apart edges 24 and 25. The anvil surface 76 may comprise first surface means 86 for engaging the material to be welded and severed between the edges 24 and 25. The first surface means 86 being formed with a knife edge 88 extending transversely to the path of travel of the strip 14 for compressing and welding the material interposed between the first surface means 86 and the forward end 68 of the horn 66 which is longitudinally vibrating at an ultrasonic rate, as illustrated by doubled headed arrow 90.

The knife edge 88 is inclined outwardly into bevelled surfaces 92 that are designed to simultaneously weld or fuse the overlapping layers of material 34 through 42, inclusive, that are engaged. Accordingly, the knife edge 88 and bevelled sections 92 provide a comparatively narrow path responsive to the ultrasonic energy applied to the horn 66.

For aesthetic purposes, as well as strength, the individual spot welds 48 are formed by providing second surface means 94 adjacent the first surface means 86 on each side thereof. The second surface means 94 may include a longitudinal row of bosses 95. The bosses 95 act in conjunction with the knife edge 88 which extends above the bosses 95 to initially engage the layers of material to commence the cutting operation. In this manner the trailing end 27 of one article is formed and the leading end 26 of another article is formed with each reciprocation of the equipment.

It is fully understood and appreciated that the shape, size and contour of the first surface means 86 and second surface means 94 may be varied to obtain the desired end result. In FIG. 8 the forward end 96 of the cutting edge 88 is contoured to obtain a rounded forward end 45 on the individual tape 12. In addition, the cutting edge 88 extends beyond the last boss 95 so as not to produce the individual spot welds 48 across the entire width of the individual tabs 22, as illustrated in FIG. 5.

The reciprocating means 82 may be comprised of a double acting cylinder 100 that may be vertically mounted as by bracket 102 to the front surface 58 of mounting plate 55. A longitudinally extending shaft 104 is connected by linkage means 105 to the upper end 74 of anvil 18. The linkage means 105 may include a bracket 106 secured to the top end 74 as by fasteners 108. An extension member 110 may be connected by a transversely extending pin 112 that is secured to the bracket 106. This permits a certain degree of freedom of motion during the reciprocation of the anvil 18 in the direction of double headed arrow 85.

The reciprocating means 82 may have associated therewith guide means 115 that may include a guide plate 116 secured to the mounting plate 55 on the front surface 58. In operative relationship to the guide plate 116 is a guide member 118 which may have a complementary interlocking arrangement with the guide plate 116. The guide member 118 may be coupled to the anvil 18 for reciprocation therewith between the operative position and open position of the tool 16 and anvil means 18.

The double acting cylinder 100 may be in the form of a fluid activated piston, well known in the art, in order to obtain the necessary movement of the anvil means 18 in timed relationship to the movement of the strip 14 on an intermittent basis. The continuous strip 14 which is provided on a roll 15 may be mounted rearwardly of the reciprocating means 82 as by a support unit 120 that extends on the surface 52 of the frame 50. A transversely extending support shaft 122 is maintained in supporting relationship on the support unit 120 to permit freedom of rotation of one or two rolls 15.

To intermittently advance the strip 14 from roll 15, feeding means 125 is provided. The feeding means 125 intermittently advances the leading end of the strip 14 a predetermined distance by means of the elements 30 contained thereon, as illustrated in FIG. 3. The feeding means 125 is movable from a retracted position to an extended position in timed relationship to the reciprocating means 82.

Simultaneously with the operation of the feeding means 125, there is continuously provided by interposing means 130 a continuous strip of insulation element 132 which may be provided on a roll 134 and progressively interposed between the tabs 22 as the strip 14 is advanced. The insulation element 132 is characterized in that while separating the tabs 22 physically from each other, it simultaneously is capable of maintaining the tabs 22 in acoustical energy coupling relationship to each other. In this manner the vibratory energy in the operative position of the reciprocating means 82 permits the insulator element 132 to transmit therethrough the ultrasonic vibratory energy.

Applicants have now discovered that a properly selected insulation element 132 permits the individual layers of material in each of the respective tabs 25 to be welded to each other. In this manner the layers of material 41 and 42 are welded to each other. In similar fashion the individual layers 32, 35, 36, and 40 may be welded to each other in the other tab 22. At the same time the insulator element 132 prevents the adjacent overlapping layers 40 and 41 of different tabs 22, to become welded to each other. The insulation element 132 may be of a paper or plastic material characterized in that it does not bond to the layers of material from which the tabs 22 are produced. Suitable plastic material has been found to be Teflon. With respect to paper, it is preferable that the paper is waxed, or otherwise coated, to avoid bonding to the material.

The thickness of the insulation element 132 is selected to be easily severed from the roll that it is supplied on. As illustrated in FIG. 4, the severed insulation element 132 is thereafter readily removable from its positionment between the tabs 22. In operation the individual tapes 12 may fall down a chute 133 provided beneath the horns 66 and into a bin 135 in which they are accumulated.

In view of the fact that the elements 30 vary as to their longitudinal spacing, the feeding means 125 has been designed to advance the strip based upon a particular number of elements 30 at a time. This is accomplished when the horn 66 is ultrasonically vibrating and the work station comprised of the anvil means 18 and horn 66 are in their open position to permit the feeding therebetween of the strip by a discrete amount.

The feeding means 125 is comprised of engaging means 136 pivotably movable into contact with one of the elements 30 on the strip 14 when advancing same and over the elements 30 when moved from the extended position designated for convenience by numeral 138 to a retracted position identified by numeral 140. The feeding means 125 includes a double acting air or hydraulic activated unit 142 that is pivotally secured at one end 144 to a clip 146 that may be mounted on the back end 60 of mounting plate 55. The opposite end of the activating unit 142 has a piston or rod 148 extending outwardly therefrom and coupled to a pivot arm or member 150. The pivot arm 150 may be partially within a housing 152 that is mounted on the rear surface 60 of the mounting plate 55. To permit the angular pivotal movement of the arm 150 between the respective phantom positions illustrated, a transversely extending shaft 154 is provided between the respective ends 156 and 158 of the arm 150. The shaft 154 permits the arm 150 to move accordingly in relationship to the movement of the shaft 148 of the activating unit 142.

The linear travel of the engaging means 136 is related to the angular movement of the arm 150. To regulate the linear travel of the engaging means 136, limit means 160 is provided and may be in the form of a pair of spaced apart inclined stops 162 mounted relative to the arm 150. In accordance with one embodiment, as is illustrated herein, the housing 152 has a rear plate 164 with an opening 166 therein through which the arm 150 extends. A pair of stop members 168 having the inclined stops 162 thereon, are mounted to the rear plate 164.

The arm 150 is rigidly coupled to a feeding member 170 extending downardly therefrom. Two engaging means 136 are utilized for a dual production line, as illustrated in FIG. 1. Each of the engaging means 136 is mounted for pivotal movement at the lower end 172 of the feeding member 170, for movement in an arcuate path, as illustrated by arrow 174. The engaging means 136 is free to move in this arcuate path illustrated by arrow 174 as the arm 170 moves in the path indicated by doubled headed arrows 175.

The engaging means 136 may include housing means 176 pivotally mounted on one end thereof by transversely extending shaft 177 through the feeding member 170. The housing means 176 as illustrated in FIG. 7, may include an axially extending opening or groove 178 at the opposite end from which it is mounted. A finger element 180 is mounted in telescopic relationship to the opening or groove 178 for longitudinal adjustment relative thereto. Securing means 182 is provided in operative relationship with the housing means 176 and finger element 180 for locking them in releasably fixed position relative to each other. The securing means may include a longitudinally extending channel 184 with a fastener having a threaded portion 185 that may mate with a complementary threaded portion in the finger element 180 and a fastener head 186 for releasably locking the finger element 180 relative to the housing means 176. In this manner when the machine is initially calibrated, the exact position of the finger element may be selected.

When the feeding means is operated, it moves forward from the retracted position 140 to the extended position 138. This movement occurs in timed relationship to the reciprocating means 82. To maintain the front or distal end 190 of the finger element 180 in contacting relationship with an element 30, biasing means 192 is utilized. The biasing means 192 may include a coiled spring 193 mounted in fixed relationship at one end 194 to the feeding member 170 and the opposite end 195 to the housing means 176. In this manner the downwardly biasing force in the direction of single headed arrow 174 is obtained as the finger element 180 pushes the strip 14 along the support surface 52 as it unwinds from roll 15. Simultaneously, the insulation element 132 is unwinding from roll 134 and a guide roll 196 may be utilized to properly assure the interposing of the insulation element 132 between the tabs 22.

When the engaging means 136 has obtained the position illustrated at 138, its forward movement is stopped by the limit means 160 and the distal end 190 is adjacent to the work station, as illustrated in FIG. 2. Retracting means is provided for returning the engaging means 136 to the retracted position 140. The retracting means in the illustrated preferred embodiment may be obtained by the reversal of the movement of piston 148 which applies the necessary downward force on arm 150 thereby swinging the feeding member 170 to the retracted position 140. During this movement the engaging means 136, due to the biasing means 192, is free to move above the spatially extending elements 130. When the engaging means reaches the retracted position 140, as illustrated in FIG. 3, it extends between two adjacent elements 30.

Figure 10:
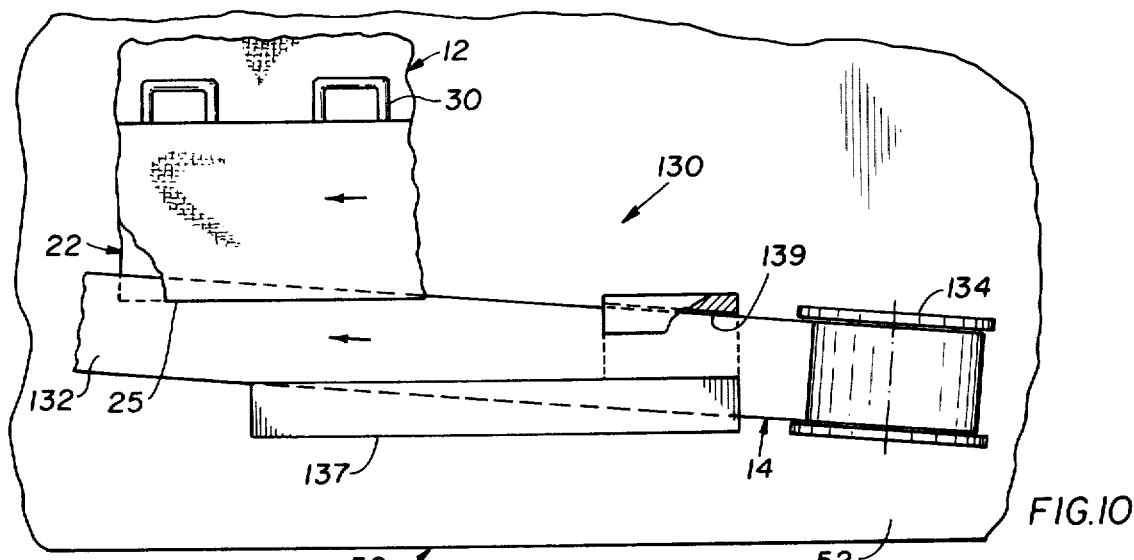
FIG. 10 is an enlarged fragmentary view, partly in section, taken along lines 10—10 of FIG. 2.

The interposing means 130, as illustrated in FIG. 10, may be positioned between the roll 134 and the guide roll 196 to properly insert the insulation element 132 on a continuous basis as the strip 14 is advanced. The interposing means 130 may include an interposing plate 137 mounted on the supporting surface 52 and having a horizontally extending channel or groove 139 for receiving the insulation element 132. The channel 139 and the roll 134 may be angularly disposed to initially insert the insulation element 132 between the tabs 22. A pair of guide rails 151 illustrated in FIG. 1, are provided in spaced relationship to each other and adjacent the mounting plate 55 and on the supporting surface 52. The guide rails 151 are in alignment with the horn 66 and provide for the final positionment of the insulation element 132 between the tabs 22.

It is appreciated that the interposing means 130 may include a positive drive to advance the insulation element 132 if same is found necessary or desired. The need for a positive drive will in part depend upon the characteristics of the insulation element 132 selected.

The width of the article formed may be varied by adjustment of the limit means 160. The movement of the feeding means 136 from its extended to retracted position takes place when the reciprocating means 82 is in its operative position. The interrelated movement and sequencing of the manufacture of the tapes 12 is accomplished by providing an automatic electrical control system that may be contained within the generator unit 75. The electrical control system provides the signal necessary for activating the reciprocating means 82 and maintaining the anvil means 18 and the horn 66 in operative relationship with each other for a specific period of time. During this period of time the welding and cutting of the tapes 14 takes place. Also during this period of time the activating unit 142 is energized such that the piston 148 moves downwardly to return the feeding means 136 to its retracted position 140 during the period of time the anvil means 18 and the horn 66 are in their operative position. This cycling of the apparatus 10 can occur in a predetermined time interval and adjusted for the width of the tapes to be produced.

After a welding and cutting cycle has been completed, and the feeding means 136 returned to its retracted position 140, the reciprocating means 82 is activated for returning the horn 66 and anvil means 18 to their open position to permit the advancing of the next portion of the strip 14 by the feeding means 136. The feeding means 136 is retracted in the operative position of the reciprocating means 82 so as not to pull the strip 14 rearwardly during this motion.

Upon activation of the reciprocating means 136, the forward end 190 of the finger element 180 engages the element 30, which may be in the form of a hook or an eye, and moves the strip 14 along the support surface 52 for the necessary distance.

Figure 11:
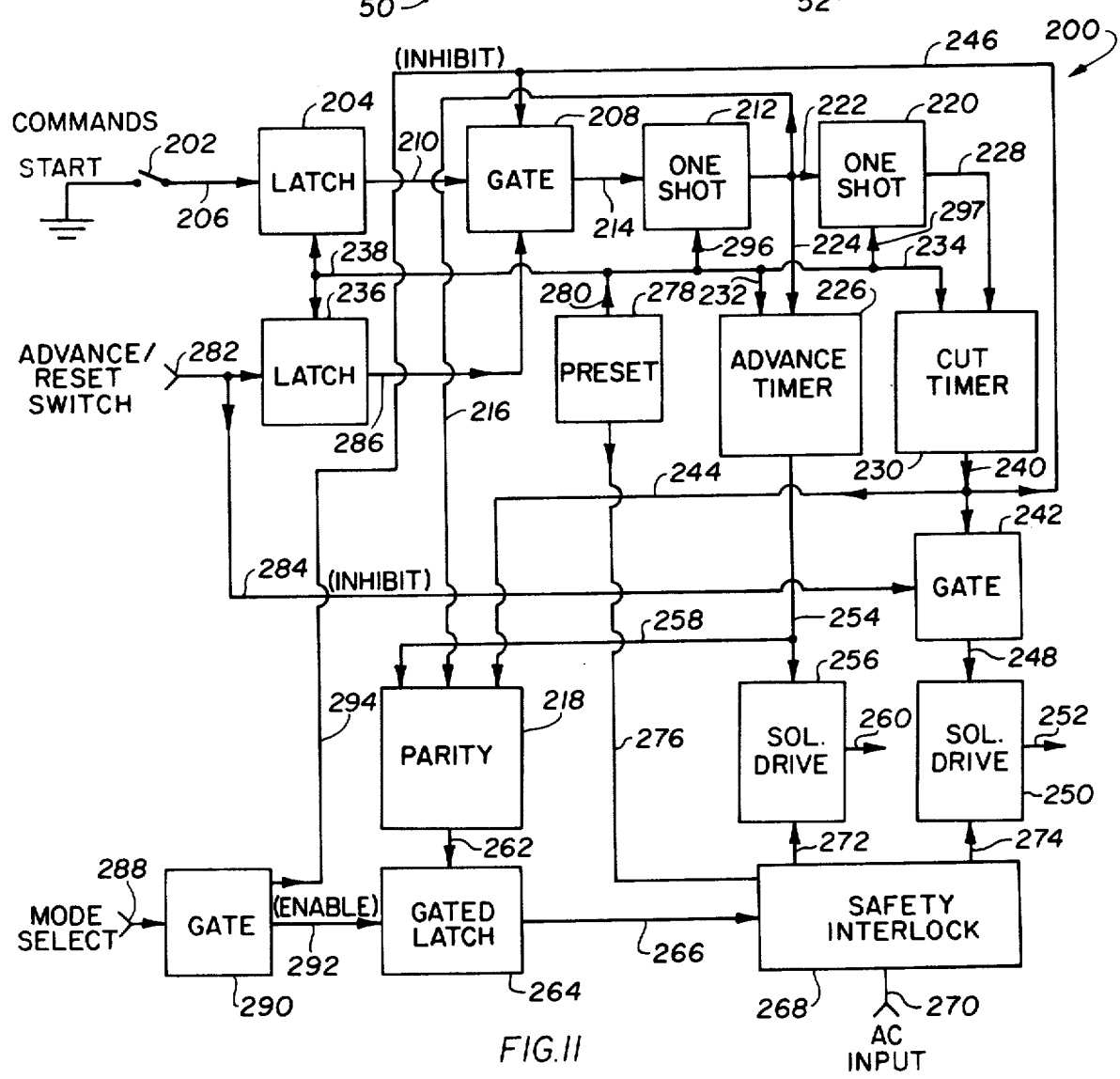
FIG. 11 is a functional block diagram of an automatic electrical control system for operating the apparatus.

Referring now to FIG. 11, there is shown a functional block diagram of a preferred embodiment of an automatic electrical control system 200 which is used to control the operation of the anvil 18, the double acting cylinder 100 and the piston unit 142. The control system 200 is powered from a conventional source of 110 volts AC, not shown, and includes conventional solid state modules to perform the required functions. The generator unit 75, which is used to energize the ultrasonic motor 65 and the horn 66, is energized by a separate switch on the generator unit 75 and is kept continually energized during the operation of the apparatus 10.

Input or start switch 202 is coupled to one input of latch 204, via a lead 206. The output of latch 204 is coupled to one input of gate 208, via lead 210. The output of gate 208 is coupled to the input of one shot multivibrator 212 via lead 214. The output of a one shot multivibrator 212 is coupled via lead 216 to one input of a parity circuit 218, to another one shot multivibrator 220 via lead 222, and via lead 224 to an advance timer 226. One output of one shot multivibrator 220 is coupled via lead 228 to cut timer 230.

The output of cut timer 230 is coupled via lead 240 to gate 242, to parity circuit 218 via lead 244, and via lead 246 to an input of gate 208. The output of gate 242 is coupled via lead 248 to a solenoid driver 250. The output of driver 250 is coupled via lead 252 to a solenoid, not shown, which controls the compressed air line that activates the double acting cylinder 100 which is part of the reciprocating means 82 (FIG. 2).

The output of advance timer 226 is coupled via lead 254 to solenoid driver 256 and via lead 258 to parity circuit 218. The output of solenoid driver 256 is coupled via lead 260 to a solenoid, not shown, which controls the air valve, not shown, that activates piston unit 142 of the feeding means 125 (FIG. 2).

The output of parity circuit 218 is coupled via lead 262 to an input of a gated latch 264. The output of gated latch 264 is coupled via lead 266 to an input of safety interlock 268. The AC input voltage is coupled via a lead 270 to the safety interlock 268. One output of safety interlock 270 is coupled via lead 272 to an input of the solenoid driver 256, another output of safety interlock 268 is coupled via lead 274 to solenoid driver 250. The output of preset circuit 278 is coupled via lead 280 to lead 238, which presets the latches 204 and 236, and the leads 232 and 234 which preset the advance timer 226 and the cut timer 230, respectively, and leads 296 and 297 which preset one shots 212 and 220, respectively, and through lead 276 to safety interlock 268.

The input of latch 236 is via lead 282 to an advance reset switch, not shown, and via lead 284 to an input of gate 242. The output of latch 236 is coupled via a lead 286 to an input of gate 208. A mode select switch, not shown, is coupled via a lead 288 to control gate 290. One output of control gate 290 is coupled via a lead 292 to an input of gated latch 264 and via a lead 294 to an input of gate 208.

In operation the system control is energized by turning on the AC power which energizes the ultrasonic motor 65 and the horn 66 and they remain energized throughout the operational advance and cut steps of the system. The system is designed to provide a single cycle or continuous operation, and is capable of generation of all of the required control pulses for continuous operation, and locks the control circuits off if a discrepancy or error in function sequence occurs. The system is also provided with an interrupt button which is capable of immediately stopping the system cycle and resetting it to the initial start conditions.

The system is set to the initial or start conditions (i.e. all solenoids deenergized and all input commands overridden) by means of the preset circuitry 278 which opens the safety interlock 270. A start pulse is obtained by closing switch 202, which permits latch 204 to turn on gate 208, thereby causing one shot multivibrator 212 to be triggered generating an output pulse, the trailing edge thereof starting the advance timer 226 and triggering one shot multivibrator 212. The trailing edge of the output pulse from multivibrator 220 starts the cut timer 230, the output pulse thereof being processed as follows:

a. If the mode select switch, which is coupled via lead 288 to gate 290, is in single cycle mode, gate 290 inhibits the output pulse from the cut timer 230 from recycling the system. The output from gate 290 also removes the enable from the gated latch 264 and the parity circuit 218 maintains its original state at the time the enable pulse was removed. The single cycle is completed when the pulse from the cut timer 230 is processed via gate 242 which energizes the solenoid drive 250.

b. If the mode select switch is in the continuous position, gate 290 enables the gated latch 264 and the parity circuit 218 is activated. The inhibit pulse to the gate 208 is removed and the trailing edge of the pulse from the cut timer 230 retriggers the system.

The parity circuit checks the states of one shot multivibrator 212, advance timer 226 and cut timer 230 against its programmed allowed states. Any dissonance between the allowed states and the signals, latches the gated latch 264 which opens the safety interlock 270. The parity circuit 218 can be reset only by removing the AC power.

If only an advance pulse is desired, a pulse may be applied to latch 236 which will provide an output pulse to gate 208, which in turn will trigger one shot multivibrator 212. The only difference between the command and the start command provided by switch 202 is that gate 242 is inhibited, thus preventing the cut solenoid drive circuitry 250 from operating.

Figure 12:
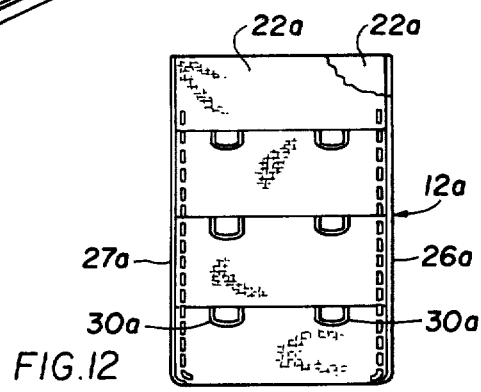
FIG. 12 is a front plan view illustrating a tape having two rows of elements positioned thereon.

As illustrated in FIG. 12, the brassiere tape 12a may be formed having two rows of spaced apart elements 30a between the respective ends 26a and 27a. This demension may be varied by properly adjusting the limit means on the equipment. In this way articles may be formed containing two, three, or four rows of elements.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

We claim:

1. Apparatus for forming tapes having a body portion and a pair of overlapping tabs extending outwardly therefrom, comprising
   A. means for providing a continuous strip of said tape having elements thereon and layers of material in said body portion and in each of said tabs weldable with ultrasonic vibratory energy,
   B. means for separating said tabs physically from each other and simultaneously maintaining said tabs in acoustical energy coupling relationship to each other, wherein said individual layers of material in said strip may be simultaneously severed and welded across said body portion and said tabs when interposed between an ultrasonically vibrating horn and an anvil, except for said layers of material in said tabs physically separated from each other, and
   C. means for advancing said strip on an intermittent basis between said horn and said anvil for continuously producing said tapes of a desired number of elements.

2. Apparatus as in claim 1, wherein said means for separating said tabs is obtained by interposing therebetween an insulation element produced from a plastic or paper material characterized in that it does not bond to said layers of material.

3. Apparatus as in claim 1, wherein said insulation element, and said tabs are simultaneously severed, and said element is readily removable from between said tabs when said tape is formed.

4. Apparatus as in claim 1, wherein the forward end of said horn is vibrated in a plane substantially normal to the surface of said anvil.

5. Apparatus as in claim 1, and further comprising reciprocating means for maintaining said anvil and said horn in an operative position for a specific period of time prior to returning to an open position when said strip is moved by said advancing means.

6. Apparatus as in claim 5, wherein said horn is vibrating during movement from said open position to said operative position.

7. Apparatus as in claim 5, wherein said advancing means functions with respect to a predetermined number of said elements which determines the width of the tape to be severed from said strip.

8. Apparatus as in claim 5, wherein said advancing means comprises
   a. engaging means pivotally movable into contact with one of said elements on said strip when advancing same, and over said elements when moved from an extended position to a retracted position, and
   b. biasing means urging said engaging means into with said element when advancing said strip.

9. Apparatus as in claim 8, and further comprising an automatic electrical control system, comprising
   a. means for activating said reciprocating means and maintaining said anvil means and said horn in said operative relationship with each other for said specific period of time, and
   b. means for energizing said advancing means to return same to its retracted position during the period of time said anvil means and said horn are in said operative position.

10. Apparatus as in claim 8, wherein said anvil comprises:
    a. first surface means for engaging the material to be welded and severed between spaced apart edges thereof, said first surface means being formed with a knife edge extending transversely to the path of travel of said strip for compressing and sealing the material interposed between said first surface means and said horn along a comparatively narrow path responsive to the ultrasonic energy applied to said horn, said knife edge cutting through said tabs and said separating means extending therebetween, and
    b. second surface means adjacent said first surface means on each side thereof for simultaneously forming a plurality of embossed welds between the layers of material of said strip on the trailing end of one tape and the leading end of another tape.

11. Apparatus for ultrasonically producing articles from an elongated continuous strip of material formed of flexible layers having a forward edge, and a rear edge terminating a pair of overlapping tabs, with a plurality of spatially separated elements extending above said strip between said edges, said apparatus comprising
    A. ultrasonic welding means comprising a horn with a forward end for engaging one side of said strip, and means for vibrating said horn at an ultrasonic rate,
    B. anvil means having a surface for opposing and cooperating with said forward end for engaging the opposite side of said strip, said horn and said anvil means adapted to simultaneously sever and weld said strip transversely between said edges when brought into operative relationship with each other,
    C. interposing means for positioning between said tabs an insulator element capable for transmitting therethrough ultrasonic vibratory energy prior to said anvil means and said horn being brought into operative relationship with each other, such that said insulation element permits individual layers of material in each of said tabs to be simultaneously welded together as said tabs and said element are severed,
    D. reciprocating means for effecting relative movement between said anvil means and said horn between an open position in which said anvil means and said horn are spaced apart for receiving said strip therebetween to an operative position in which said surface of said anvil means and said forward end of said horn are moved together for engaging said strip on opposite sides thereof, said horn in said operative position is ultrasonically vibrated to effect a severing and welding of the layers of said strip across the width thereof between said edges so as to form the trailing end of one article and the leading end of another article, E. feeding means for intermittently advancing the leading end of said strip a predetermined distance by means of one of said elements, said feeding means movable from a retracted position to an extended position in timed relationship to said reciprocating means.

12. Apparatus as in claim 11, wherein said horn is stationary and said anvil means is movable by said reciprocating means toward and away from said horn in timed relationship with said feeding means.

13. Apparatus as in claim 12, wherein said reciprocating means comprises a fluid activated piston and linkage means connecting said piston to said anvil means.

14. Apparatus as in claim 11, wherein said horn is vibrating as said strip is advanced relative thereto by said reciprocating means.

15. Apparatus as in claim 14, wherein said reciprocating means is operated as said horn is vibrating.

16. Apparatus as in claim 11, and further comprising
    a. a frame having a supporting surface on which said strip is intermittently advanced by said feeding means, and
    b. said reciprocating means is vertically mounted on said frame for movement in a plane substantially normal to said supporting surface.

17. Apparatus as in claim 16, and further comprising support means on said frame for rotatably mounting rearwardly of said feeding means a roll of said strip for dispensing same along said supporting surface.

18. Apparatus as in claim 17, wherein said interposing means includes mounting means for rotatably supporting a roll of said insulation element adjacent said support means for positionment between said tabs and advancement with said strip by said feeding means.

19. Apparatus as in claim 18, wherein a dual line of the articles are simultaneously produced by said apparatus by providing at least a pair of said support means, mounting means, and said gripping means relative to said frame.

20. Apparatus as in claim 11, wherein said insulation element is produced from a plastic or paper characterized in that it does not weld to said layers of material.

21. Apparatus as in claim 11, wherein said feeding means comprises
    a. engaging means pivotally movable into contact with one of said elements on said strip when advancing same, and over said elements when moved from said extended position to said retracted position, and
    b. biasing means urging said engaging means into contact with said element when advancing said strip.

22. Apparatus as in claim 21, wherein said engaging means comprises
    a. housing means pivotally mounted on one end thereof and having an axially extending opening in the opposite end thereof,
    b. a finger element mounted in telescopic relationship in said opening of said housing means for longitudinal adjustment relative thereto, and
    c. securing means in operative relationship with said housing means and said finger element for locking them in position relative to each other.

23. Apparatus as in claim 11, wherein said anvil surface comprises
    a. first surface means for engaging the material to be welded and severed between said edges, said first surface means being formed with a knife edge extending transversely to the path of travel of said strip for compressing and welding the material interposed between said first surface means and said horn along a comparatively narrow path responsive to the ultrasonic energy applied to said horn, said knife edge cutting through said tabs and said insulation element extending therebetween, and
    b. second surface means adjacent said first surface means on each side thereof for simultaneously forming a plurality of embossed welds between the layers of material of said strip on the trailing end of one article and the leading end of another article.

24. Apparatus as in claim 11, and further comprising retracting means for moving said feeding means from said extended position to said retracted position for contacting another of said spatially separated elements and subsequently advancing said strip in timed relationship to said reciprocating means.

25. Apparatus as in claim 10, and further including limit means for adjusting the linear travel of said feeding means and said retracting means relative to a number of said longitudinally spaced elements advanced during each reciprocation of said feeding means, said feeding means adapted to advance said strip a distance based on a predetermined number of said elements and wherein said limit means is adjustable to vary the number of said elements advanced to determine the width of the article to be severed from said strip.

26. Apparatus for ultrasonically producing brassiere tapes from an elongated continuous strip of material formed of flexible layers having a forward edge, and a rear edge terminating in a pair of overlapping tabs, with a plurality of spatially separated elements extending above said strip between said edges, said apparatus comprising:
    A. ultrasonic welding means comprising a horn with a forward end for engaging one side of said strip, and means for vibrating said horn at an ultrasonic rate,
    B. anvil means having a surface for opposing and cooperating with said forward end for engaging the opposite side of said strip, said horn and said anvil means adapted to simultaneously sever and weld said strip transversely between said edges when brought into operative relationship with each other.
    C. interposing means for positioning between said tabs an insulator element capable of transmitting therethrough ultrasonic vibratory energy prior to said anvil means and said horn being brought into operative relationship with each other, such that said insulation element permits individual layers of material in each of said tabs to be simultaneously welded together as said tabs and said element are severed,
    D. reciprocating means for effecting relative movement between said anvil means and said horn between an open position in which said anvil means and said horn are spaced apart for receiving said strip therebetween to an operative position in which said surface of said anvil means and said forward end of said horn are moved together for engaging said strip on opposite sides thereof as said horn in said operative position is ultrasonically vibrated to effect a severing and welding of the layers of said strip across the width thereof between said edges so as to form the trailing end of one tape and the leading end of another tape, E. feeding means for intermittently advancing the leading end of said strip a predetermined distance by means of one of said elements, said feeding means movable from a retracted position to an extended position in timed relationship to said reciprocating means, F. retracting means for moving said feeding means from said extended position to said retracted position for contacting another of said spatially separated elements and subsequently advancing said strip in timed relationship to said reciprocating means, and G. said feeding means including:
 1. engaging means pivotally movable into contact with one of said elements on said strip when advancing same, and over said elements when moved from said extended position to said retracted position, and
 2. biasing means urging said engaging means into contact with said element when advancing said strip.

27. Apparatus as in claim 26,
 a. wherein said anvil surface comprises:
  1. first surface means for engaging the material to be welded and severed between said edges, said first surface means being formed with a knife edge extending transversely to the path of travel of said strip for compressing and welding the material interposed between said first surface means and said horn along a comparatively narrow path responsive to the ultrasonic energy applied to said horn, said knife edge cutting through said tabs and said insulation element extending therebetween, and
  2. second surface means adjacent said first surface means on each side thereof for simultaneously forming a plurality of embossed welds between the layers of material of said strip on the trailing end of one tape and the leading end of another tape, and
 b. limit means for adjusting the linear travel of said feeding means and said retracting means relative to a number of said longitudinally spaced elements advanced during each reciprocation of said feeding means, said feeding means adapted to advance said strip a distance based on a predetermined number of said elements and wherein said limit means is adjustable to vary the number of said elements advanced to determine the width of the tape to be cut from said strip.

28. Apparatus as in claim 26, and further comprising an automatic electrical control system, comprising:
 a. timing means for activating said reciprocating means and maintaining said anvil means and said horn in said operative position for a specific period of time, and
 b. means for energizing said retracting means to return said feeding means to said retracted position during the period of time said anvil means and said horn are in said operative position and thereafter advancing said feeding means.

29. Apparatus as in claim 26, and further comprising:
 a. a frame having a supporting surface on which said strip is intermittently advanced by said feeding means,
 b. said reciprocating means is vertically mounted on said frame for movement of said anvil means in a plane substantially normal to said horn,
 c. support means on said frame mounted rearwardly of said feeding means for rotatably mounting a roll of said strip of material for dispensing same along said supporting surface, and
 d. mounting means for rotatably supporting a roll of said insulation element adjacent said support means for positioning between said tabs and advancement with said strip by said feeding means.

* * * * *